(12) United States Patent
Karls (10) Patent No.: US 9,470,252 B2
(45) Date of Patent: *Oct. 18, 2016

(54) STACKABLE FASTENER (71) Applicant: NMC GROUP, INC., Pomona, CA (US)

(72) Inventor: James D. Karls, Pomona, CA (US)

(73) Assignee: NMC GROUP, INC., Pomona, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/554,647

(22) Filed: Nov. 26, 2014

(65) Prior Publication Data

US 2015/0300533 A1    Oct. 22, 2015

Related U.S. Application Data (63) Continuation-in-part of application No. 14/255,792, filed on Apr. 17, 2014.

(51) Int. Cl.
| | |
|---|---|
| *F16B 2/04* | (2006.01) |
| *B60R 16/02* | (2006.01) |
| *F16B 19/10* | (2006.01) |
| *F16B 27/00* | (2006.01) |

(52) U.S. Cl.
CPC .............. *F16B 2/04* (2013.01); *B60R 16/0215* (2013.01); *F16B 19/1081* (2013.01); *F16B 27/00* (2013.01)

(58) Field of Classification Search
CPC .................................. F16L 3/222; F16L 2/04
See application file for complete search history.

(56) References Cited

U.S. PATENT DOCUMENTS

| | | | | |
|---|---|---|---|---|
| 2,542,144 | A * | 2/1951 | Kearns | F16B 19/1081 174/153 R |
| 3,728,761 | A * | 4/1973 | Holly | F16B 5/02 411/166 |
| 4,405,272 | A * | 9/1983 | Wollar | F16B 19/1081 411/41 |
| 4,705,442 | A | 11/1987 | Fucci | |
| 6,045,309 | A * | 4/2000 | LeVey | F16B 19/1081 411/349 |
| 6,511,028 | B1 | 1/2003 | Gretz | |
| 7,208,853 | B2 | 4/2007 | Terrill et al. | |
| 7,281,303 | B2 | 10/2007 | Terrill et al. | |
| 7,621,487 | B2 | 11/2009 | Brown et al. | |
| 7,686,259 | B2 * | 3/2010 | Caveney | B60R 16/0215 211/85.5 |
| 7,758,502 | B2 | 7/2010 | Phillips et al. | |
| 7,770,852 | B2 | 8/2010 | Caveney | |
| 7,913,957 | B2 | 3/2011 | Nelson et al. | |
| 8,376,287 | B2 | 2/2013 | Zhang | |

FOREIGN PATENT DOCUMENTS

GB        2478772 A       9/2011

* cited by examiner

*Primary Examiner* — Jeanette E Chapman
(74) *Attorney, Agent, or Firm* — Russo & Duckworth, LLP; David G. Duckworth (57) ABSTRACT

A hybrid stackable fastener is provided for mounting to a substrate having a threaded hole. The hybrid stackable fastener is constructed to support stackable fasteners not having a threaded element. The hybrid stackable fastener has a body having a central bore defining a central axis. The central bore is tapered so as to have a diameter smaller at the bore's proximal end than toward its distal end. The hybrid stackable fastener further includes a bolt having a screw thread which extends distally from the body's central bore. Preferably, the fastener includes a plurality of spokes which radially project from the body so as to support a concentric ring.

2 Claims, 14 Drawing Sheets

STACKABLE FASTENER

RELATED APPLICATIONS

The present application is a continuation-in-part of co-pending U.S. patent application Ser. No. 14/255,792 filed Apr. 17, 2014.

BACKGROUND OF THE INVENTION

The present invention relates to mounts and fasteners. More specifically, the present invention relates to mounts and fasteners for bundling and tying elongate objects such as electrical wires, tubes and hoses, and for securing such objects to a support.

Many types of mounting devices have been developed over the years for holding one or more elongate objects to a support. One of the more popular devices for use in vehicles, including automobiles and airplanes, has been the "P" clamp. The P clamp includes a metal strap formed into a generally circular portion with each end of the strap terminating in a flat foot portion. After elongate objects are encircled by the circular portion, the feet are overlapped until apertures in the feet are aligned to receive a threaded fastener. Unfortunately, P clamps suffer from numerous disadvantages. Foremost, P clamps are generally not adjustable so that when they are used in an environment where different sizes of bundles have to be accommodated, a large inventory of different sized P clamps must be maintained. Also, it is difficult to achieve a predetermined tension on the held objects, and thus it is sometimes necessary to use additional fillers to encircle the objects to provide consistent compressive forces. The P clamp has changed very little over the years which is surprising considering the various problems associated with their use. Most assemblers agree that the installation of these clamps is difficult because of their stiffness. Furthermore, the use of commercially available P clamps on electrical cables is complicated by the fact that electrical cable diameter dimensions are not tightly controlled and that cables have "soft" irregular cross-sections which can be damaged by excessive force caused by securing with a P clamp.

Relatively recently, ring post fasteners have been introduced into the aircraft industry. For example, U.S. Pat. No. 6,880,787 describes a ring post fastener which has a central post. On one end of the post is a female threaded attachment and at the other end of the post is a male threaded attachment. The male and female threads allow the fastener to be stacked. In addition, the ring post fastener has a plurality of spokes which radially project from the post and a ring affixed to the end of the spokes. U.S. Pat. No. 7,770,852 describes a ring post fastener wherein the ring is capable of freely rotating about the central post. Again, this fastener is stackable. Unfortunately, present ring post fasteners, as well as other fasteners, typically require that the fastener attach to a threaded substrate. However, not all underlying substrate surfaces have a male or female threaded feature.

Tie straps, also referred to as cable ties, have been widely used for bundling wires, and for securing such wires to a support. The tie strap structure includes a flexible tie for circling a bundle and a buckle at one end of the tie to lock the tie strap structure into a loop. Various mounts have been developed for securing the tie strap and bundle of wires to a support. The mounts include one or more windows or slots for receiving one end of the tie strap which is then looped back upon itself to be attached by the tie strap's buckle. The mounts are then affixed to a support surface by a threaded fastener or adhesive.

Advantageously, tie straps have adjustable diameters to accommodate a wide variety of bundle diameters. Accordingly, such fasteners typically do not require fillers to provide consistent compressive forces upon objects to be bundled. Unfortunately, presently available mounts for tie straps require that both sides of the mount be accessible for entry and exit of the strap. Further, such mounts require the additional component of an adhesive or of a threaded fastener to secure the mount to a support surface, thereby requiring that an additional inventory of components be maintained.

Accordingly, it would be advantageous to provide an improved fastener which was stackable, and which could mount to non-threaded surfaces.

Furthermore, it would be advantageous to provide an improved fastener and mount construction for bundling and securing elongate objects such as electrical wires and hoses.

Still an additional advantage to an improved fastener would be that the fastener was lightweight, inexpensive to manufacture, and did not require a large number of components.

SUMMARY OF THE INVENTION

The present invention addresses the aforementioned disadvantages by providing an improved fastener which is capable of stacking and which is capable of affixing to a substrate's non-threaded hole.

The stackable fastener includes a body having a central bore defining a central axis. Preferably, the body is cylindrical so as to form an annular construction. The bore has first and second ends, which for convenience, are referred to herein as a distal end and a proximal end. The body's central bore is tapered so as to have a diameter smaller at the bore's proximal end than towards the bore's distal end. In addition, the stackable fastener has a plurality of flexible fingers which extend axially and distally from the body's distal extremity and which are positioned concentrically about the central bore's central axis. The stackable fastener may have any number of fingers. However, it is believed that at least two fingers are required, and at least three fingers are preferred. Preferably, the fingers are constructed to be thicker at their distal ends than their proximal ends.

The stackable fastener further includes a force member which is positioned within the fastener's central bore and within the central area between the concentrically positioned fingers. The force member is constructed to force the fingers radially outward when rotated to a first position. However, the force member allows the fingers to retract inwardly when the force member is rotated to a second position.

The stackable fastener's force member may be constructed in different ways to force the fingers radially outward. In a first embodiment, the force member has a substantially cylindrical construction except that its distal extremity is constructed as a cam so as to include a plurality of radially projecting projections. This "cam" embodiment is rotatable within the body's central bore, but not axially movable. The cam's projections are sized and positioned to reside within spaces between the stackable fastener's fingers when the fingers are not intended to be forced outward. However, rotation of the cam force member causes the projections to engage the fingers so as to force the fingers outwardly. Moreover, preferably the force member includes a detent and the stackable fastener's body includes a notch positioned for locking the force member into its rotational position so as to lock the fingers radially outward. Moreover, the fingers may include notches to receive the cam's projections to provide additional locking capability. Rotation of the force member can be accomplished by various constructions known to those skilled in the art. In a preferred embodiment, the force member includes a hexagonal recess formed into the force member's upper surface so as to accept a hexagonal tool. Other constructions, including slots for screwdrivers, are also acceptable.

In a second embodiment, the stackable fastener's force member is constructed in the form of a "plunger" which is rotatable and axially slideable within the central bore and fingers. Preferably, the plunger has a tapered construction wherein the plunger is tapered so as to have a wider cross-section at its proximal end than its distal end. The preferred shapes for the plunger include a conical shape or elliptical conical shape, though other shapes can also be adopted as can be selected by those skilled in the art. As a result of the plunger's tapered construction and fingers having an increased thickness at their distal extremity, the plunger's movement in the distal direction causes the plunger to engage and push the fingers radially outward. Preferably, the fingers are biased inward due to the inherent properties of the material that the fingers are made with so that when the plunger is moved proximally in the central bore to a proximal position the fingers will return inwardly to an unstressed or less stressed conditioned.

Advantageously, the stackable fastener is constructed to affix to a substrate having a hole sized for receipt of the fastener fingers when the force member is rotated to a position that the fingers are biased inwardly. However, where the hole is dimensioned correctly, the force member and fingers are sized to lock the stackable fastener to the substrate when the force member is rotated so as to move the fingers outward. In addition, the stackable fastener of the present invention is constructed to stack upon itself. To this end, the fingers, force member and tapered bore are constructed so that the stackable fastener of the present invention can be stacked upon a like fastener. This is accomplished by inserting the fingers of one stackable fastener into the central bore of a similar stackable fastener when the first fastener's force member is rotated so that the fingers are positioned inward. However, the force member and fingers are sized so that the fingers expand radially within the second stackable fastener's central bore when the first stackable fastener's force member is rotated so as to force the first stackable fastener's fingers radially outward.

Preferably, the stackable fastener is constructed in the form of a ring-post fastener wherein the stackable fastener's body forms a post having first and second ends which defines the fastener's longitudinal axis. A plurality of spokes radially project from the post's longitudinal axis. Further, this ring-post fastener embodiment of the present invention includes a ring concentrically aligned with the fastener's post which is affixed in place by the fastener's spokes, in similar manner to a bicycle wheel construction. The separation between spokes creates a plurality of slots with each slot's periphery defined by the fastener's post, adjacent spokes and ring. The plurality of slots are sized for receipt and passage of a conventional tie strap.

In a preferred embodiment of the invention, the ring-post fastener embodiment includes four radially projecting spokes which create four equal sized slots, with each slot sized for receipt of a conventional tie strap. Though the ring-post fastener embodiment is described herein as including four spokes, the fastener may include more or less spokes depending on the size and use of the fastener without departing from the spirit or scope of the invention.

In still an additional embodiment, a hybrid ring post fastener is provided for affixing to a substrate having a threaded hole for supporting fasteners described above which do not possess threaded features. More specifically, the hybrid ring post fastener includes a male threaded element instead of distally extending fingers capable of projecting radially outward. However, the hybrid stackable fastener still possesses a body having a central bore defining a central axis. The bore has first and second ends and the central bore is tapered so as to have a diameter smaller at the bore's proximal end than toward the bore's distal end. Furthermore, the hybrid fastener includes an annular shoulder within the central bore at the bore's distal end. The annular shoulder forms a circular opening having a diameter smaller than the interior diameter of the central bore at the bore's proximal end. To provide the male threads extending distally from the body's distal end, the hybrid fastener includes a bolt having a head and a screw thread. The bolt may be affixed within the annular shoulder with the screw threads extending distally in the direction of the fastener's central axis from the body's central bore so as to provide a screw thread that is not rotatable relative to the fastener's body. However, in a more preferred embodiment, the bolt's head has a diameter smaller than the diameter of the bore's proximal section but has a diameter larger than the diameter of the annular shoulder's opening. Furthermore, the bolt's screw thread has a diameter smaller than the annular shoulder's opening. The bolt is positioned with the bolt's head within the bore's proximal section with the bolt's threads extending through the annular shoulder's opening so as to extend distally from the fastener's body. Advantageously, the embodiment allows the bolt to rotate relative to the fastener's body.

Preferably the hybrid stackable fastener is also constructed to form a ring post fastener wherein the fastener's body forms a post and spokes radially projecting from the post's longitudinal axis. A ring concentrically aligned with the fastener's body is affixed to the end of the fastener spokes. Preferably, the hybrid fastener includes four radially projecting spokes forming four equal sized slots with each slot sized for receipt of a conventional tie strap.

Thus, an advantage of the present invention is to provide an improved fastener which is stackable to similar fasteners, and which can mount to non-threaded surfaces.

Still an additional advantage of the present invention is to provide an improved fastener and mount construction for bundling and securing elongate objects such as electrical wires and hoses.

Still an additional advantage of the present invention is providing an improved fastener that the fastener is lightweight, inexpensive to manufacture, and does not require a large number of components.

Still an additional advantage of the present invention is to provide a ring-post fastener that does not require the use of additional bolts or washers to affix the fastener to a support surface.

Other features and advantages of the present invention will be appreciated by those skilled in the art upon reading the detailed description which follows with reference to the attached drawings.

DETAILED DESCRIPTION OF THE INVENTION

While the present invention is susceptible of embodiment of various forms, as shown in the drawings, hereinafter will be described the presently preferred embodiments of the invention with the understanding that the present disclosure is to be considered as an exemplification of the invention, and it is not intended to limit the invention to the specific embodiments illustrated.

With reference to the figures, the stackable fastener 1 of the present invention includes a body 7 and fingers 15. The body is generally cylindrical and has a substantially cylindrical central bore 9. As illustrated in FIGS. 3A, 3B, and 9-11, the central bore 9 has a proximal end 11 and a distal end 13. Furthermore, its is preferred that the central bore is tapered so as to have a diameter smaller at the bore's proximal end 11 than at the central bore's distal end 13. Meanwhile, the stackable fastener's fingers 15 extend distally from the body's distal end. The fingers are preferably of equal length and are positioned concentrically about the stackable fastener 1.

Figure 1:
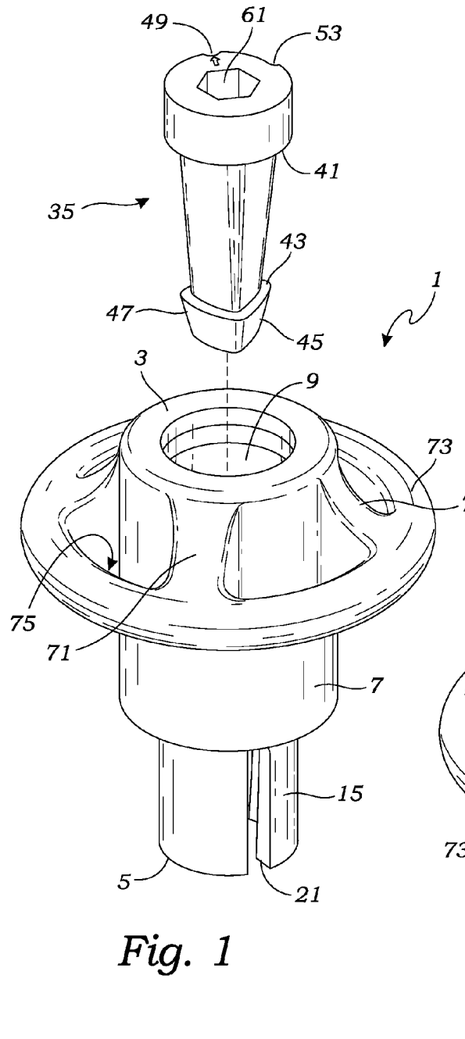
FIG. 1 is an exploded perspective view of a first embodiment of the stackable fastener of the present invention.
Figure 2A:
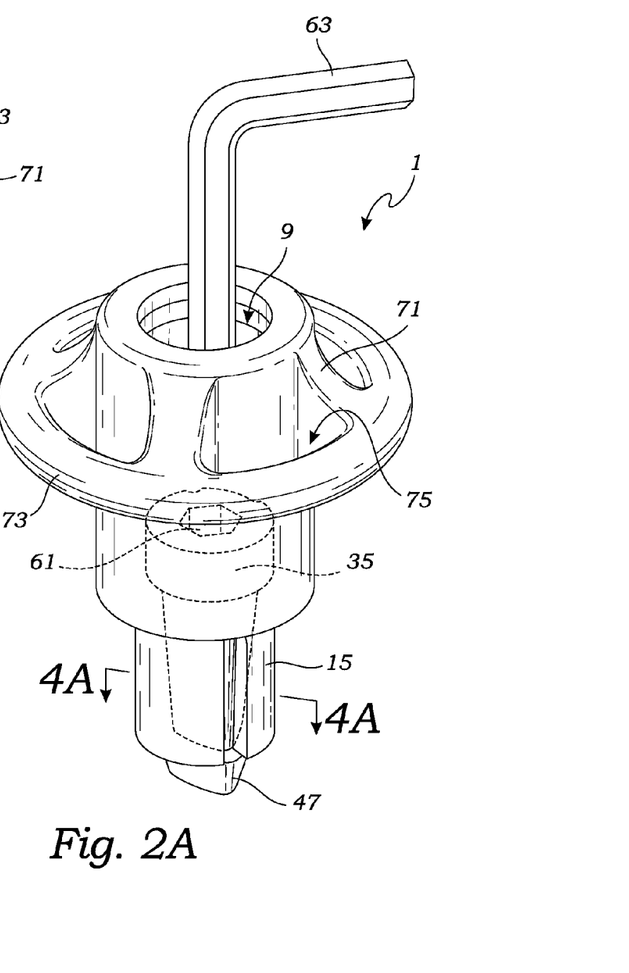
FIG. 2A is a perspective view of the stackable fastener of FIG. 1 illustrating its use with a hexagonal tool.
Figure 2B:
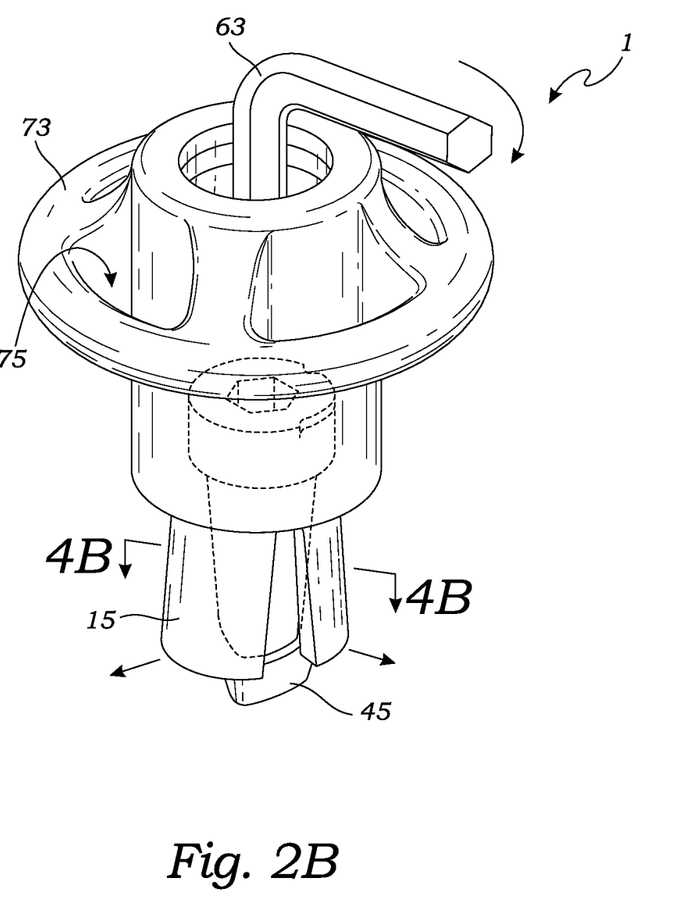
FIG. 2B is a top perspective view illustrating the stackable fastener's force member being rotated so as to force fingers radially outward.
Figures 3A, 3B:
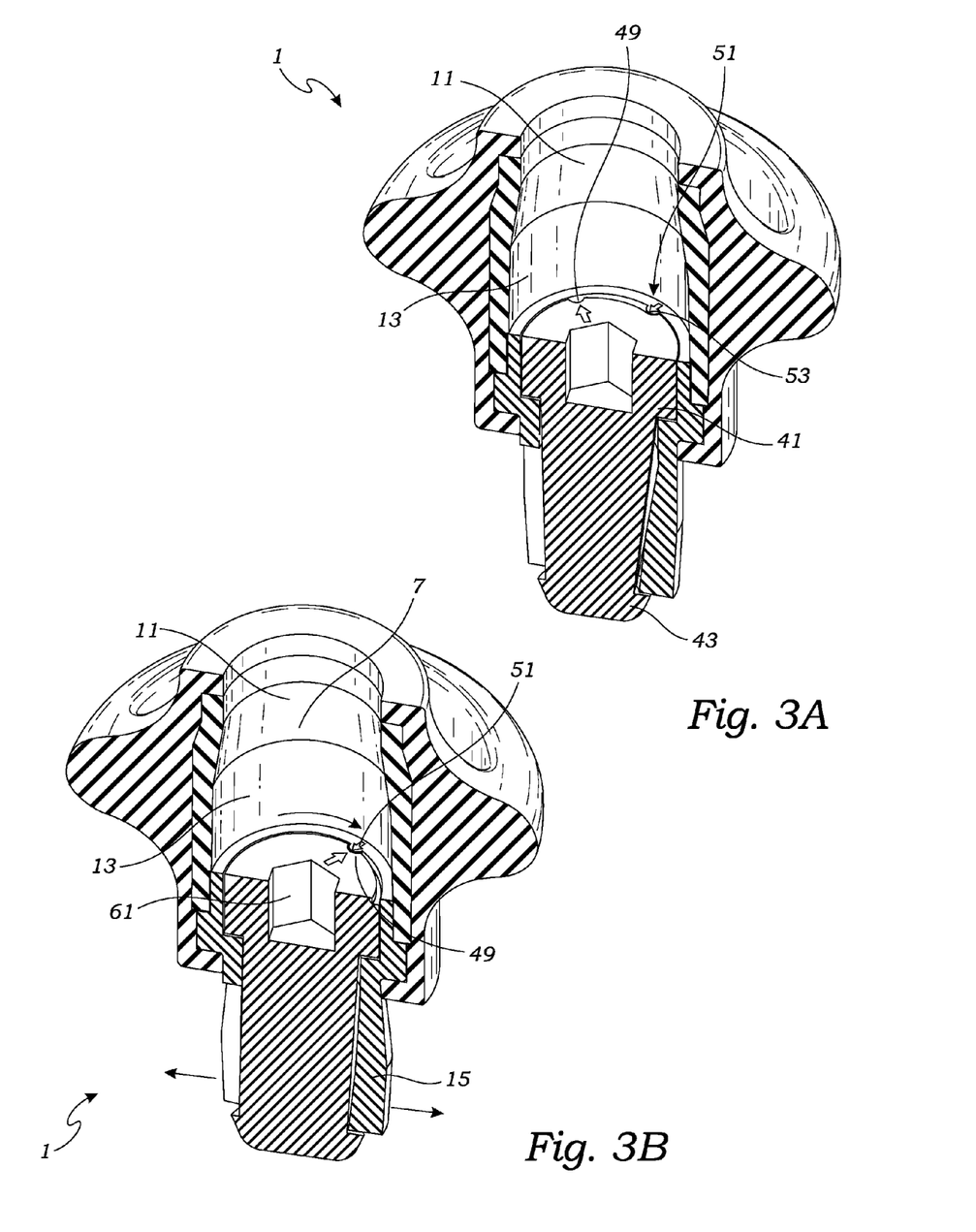
FIG. 3A is a top perspective cut-away view illustrating the stackable fastener's force member rotated to allow the fingers to retract inwardly.
FIG. 3B is a top perspective cut-away view illustrating the stackable fastener's force member rotated so as to force fingers radially outward and illustrating the force member including a notch to accept a detent to lock the force member in place.
Figure 4A:
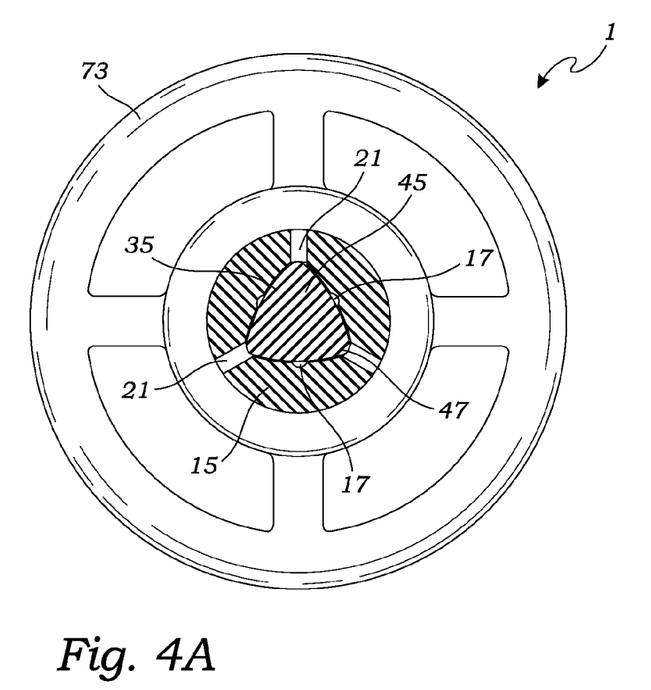
FIG. 4A is a bottom cut-away view illustrating the force member rotated to a position so as to allow the stackable fastener's finger to retract inwardly.
Figure 4B:
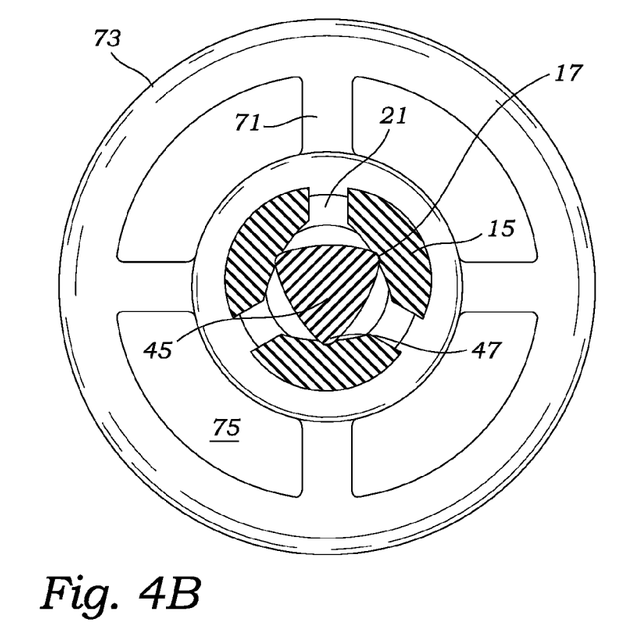
FIG. 4B is a bottom cut-away view illustrating the force member rotated so as to force the stackable fastener's fingers radially outwardly and illustrating the fingers including notches to lock the force member in place.
Figures 5, 6A:
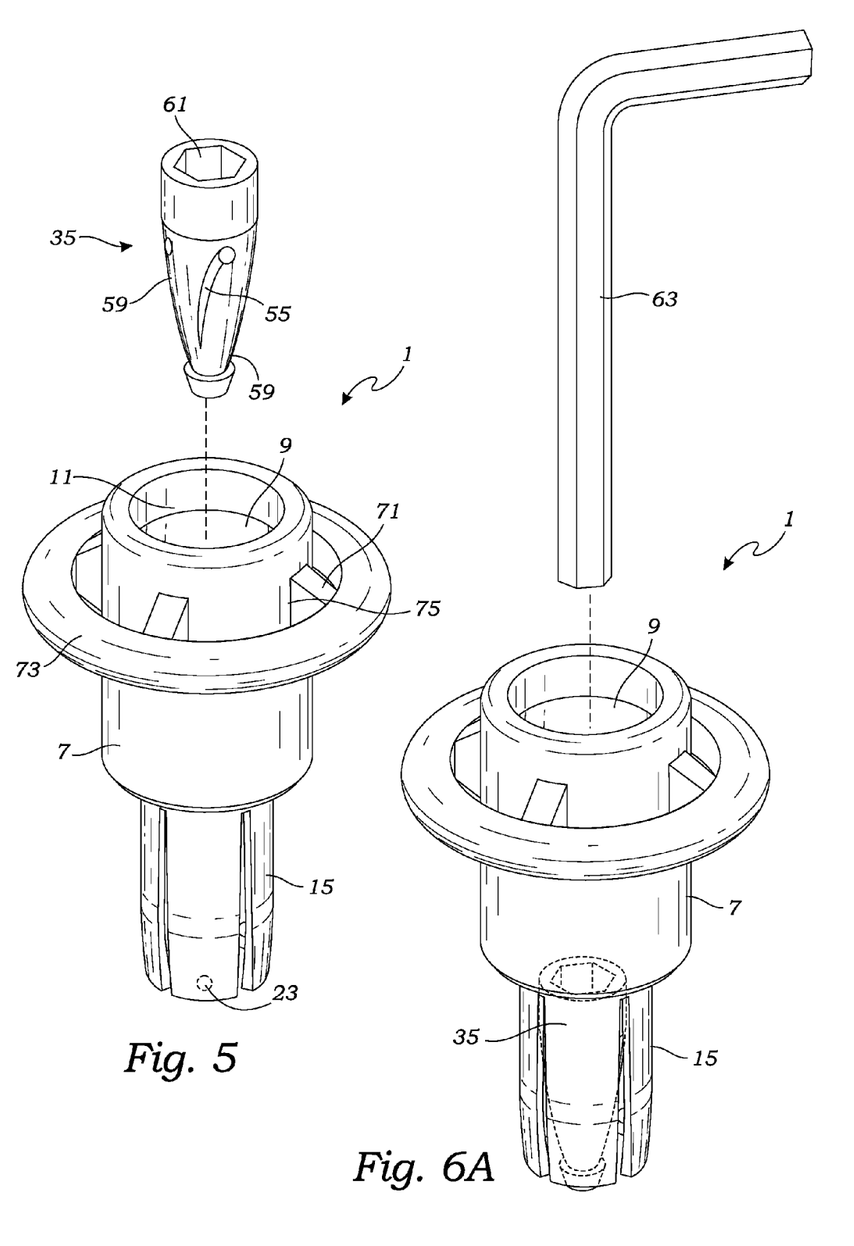
FIG. 5 is a top exploded perspective view of a second embodiment of the stackable fastener of the present invention.
FIG. 6A is a top perspective view of the stackable fastener illustrated in FIG. 5 illustrating its use with a hexagonal tool.

In addition, the stackable fastener 1 includes a force member 35. The force member is provided so as to controllably force the fingers 15 radially outward, or allow the fingers to retract radially inward. The force member 15 is positioned within the fastener's central bore 9 and extends axially between the fingers 15. In a first embodiment illustrated in FIGS. 1-4, the force member 35 has a cylindrical proximal end for rotating within the fastener's cylindrical central bore 9. In addition, the force member includes a cam 45 which forms the distal end of the force member 35. The cam 45 includes a plurality of projections 47 wherein the cam has the same number of projections as the stackable fastener has fingers 15. As best illustrated in FIG. 4A, the projections 47 are configured so as to reside within the spaces 21 between the fingers so as to not force the fingers radially outward. As best illustrated in FIG. 4B, the rotation of the force member 35 within the central bore 9 causes the projections to move out of the spaces 21 so as to engage the inner surfaces of the fingers 15. As illustrated in the figures, a preferred stackable fastener includes three fingers 15 and the cam 45 includes a corresponding three projections.

Preferably, the stackable fastener 1 includes a mechanical structure for locking the force member 35 when the force member has forced the fingers radially outward. In a preferred embodiment, this lock is accomplished by providing each of the fingers with notches 17 sized to receive the projections 47. (See FIGS. 4A and 4B). In still an additional embodiment illustrated in FIGS. 3A and 3B, the force member 35 includes an upper shoulder 41 and a lower shoulder 43 for preventing removal of the force member from the stackable fastener's central bore 9. In addition, the force member includes a notch 49 for receiving a detent 51 which, as illustrated in FIG. 3B, projects into the force member notch 49 so as to rotationally lock the force member in place so as to lock the fingers radially outward. Also preferable, the force member includes a stop 53 to engage the body detent 51 to limit rotation of the force member within the central bore when the force member is rotated to position the force member's projections between the fingers so as to cause the fingers to retract radially inward.

Figures 6B, 6C:
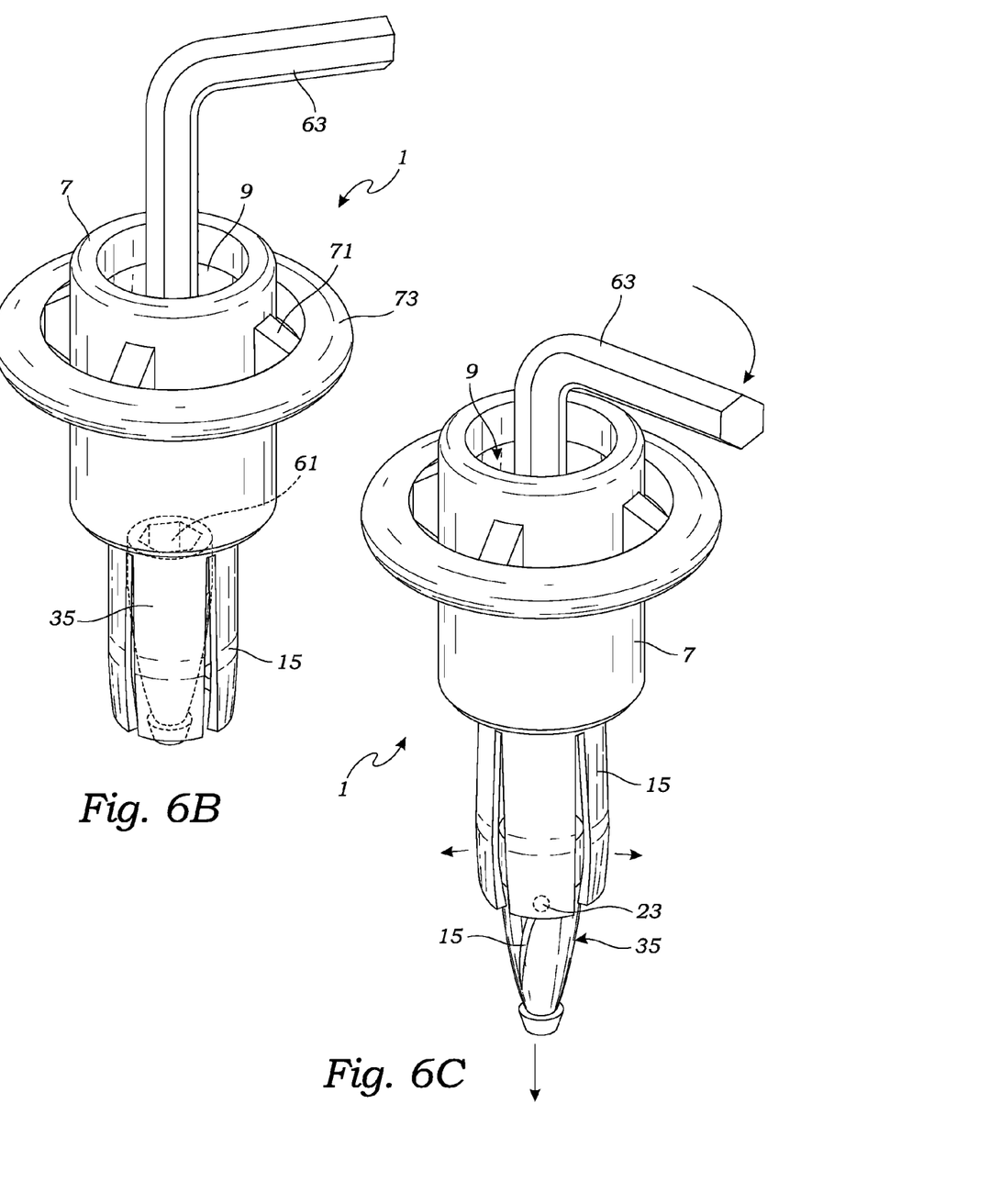
FIG. 6B is a top perspective view of the stackable fastener illustrated in FIG. 5 wherein the force member has been rotated so as to allow the stackable fastener's fingers to retract inwardly.
FIG. 6C is a top perspective view of the stackable fastener illustrated in FIG. 5 wherein the force member has been rotated to a position forcing the stackable fastener's fingers radially outward.

As understood by those skilled in the art, for the stackable fastener embodiment of FIGS. 1-4, the force member is rotatable within the stackable fastener's central bore, but not movable axially with respect to the stackable fastener's body. In a second embodiment of the present invention, the stackable fastener's force member is constructed to move axially as the force member is rotated. With reference to FIGS. 5-11, the force member 35 has a cylindrical proximal region and a tapered distal region 59 which has a wider cross-section toward the proximal end of the force member 35 than at its distal end. In addition, the force member includes one or more spiral slots 55. In an embodiment not shown, the force member includes a single spiral slot 55 which winds itself helically upon the tapered distal region of the force member. However, in a preferred embodiment illustrated in FIGS. 5-6, the force member 35 includes four arcuate slots 55. Each of these slots are sized to receive nubs 23 which project radially inward from the distal ends of the fingers 15. Rotation of the force member within the stackable fastener's central bore 9 causes the force member to travel upwardly or downwardly as the nubs 23 travel within the slots 55. Rotation is preferably accomplished using a hexagonal tool 63 fitted within a hexagonal recess 61 formed in the top surface of the force member. As illustrated in FIGS. 6B and 6C, rotation of the force member causes the force member to move distally with the force member's tapered surface 59 forcing the fingers 15 radially outward. Preferably, the fingers 15 can be locked radially outward by providing the force member's slot 55 with a circular recess for receiving the finger's nub 23.

Figure 12:
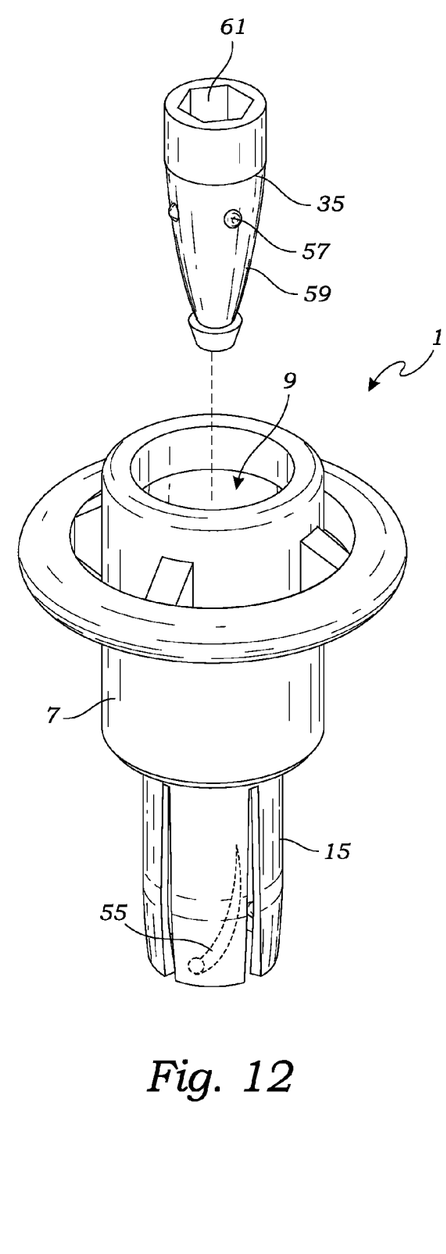
FIG. 12 is an exploded top perspective view of a third embodiment of the stackable fastener of the present invention.
Figure 13:
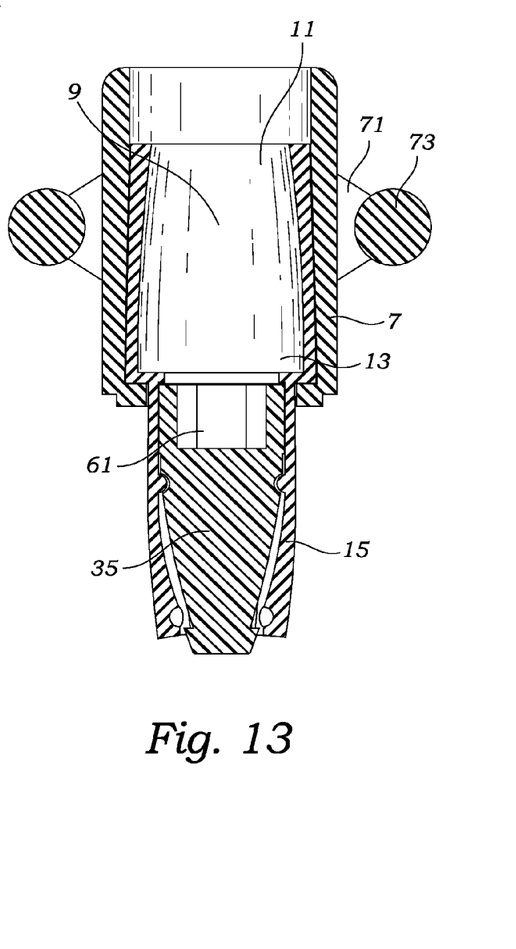
FIG. 13 is a side cross-sectional view of the stackable fastener illustrated in FIG. 12.
Figure 14A:
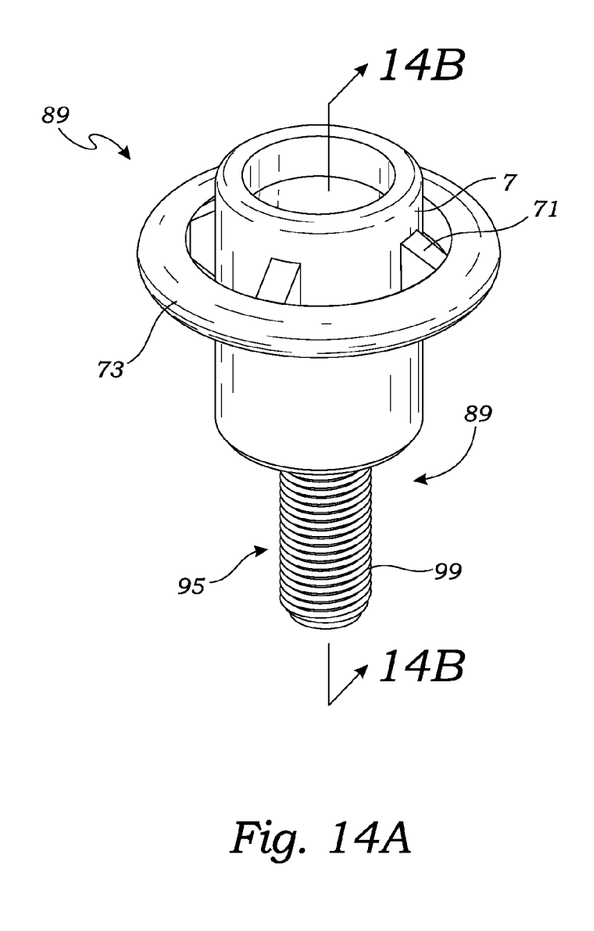
FIG. 14A is a top perspective view of a stackable fastener of the present invention for affixing to a threaded substrate.
Figure 14B:
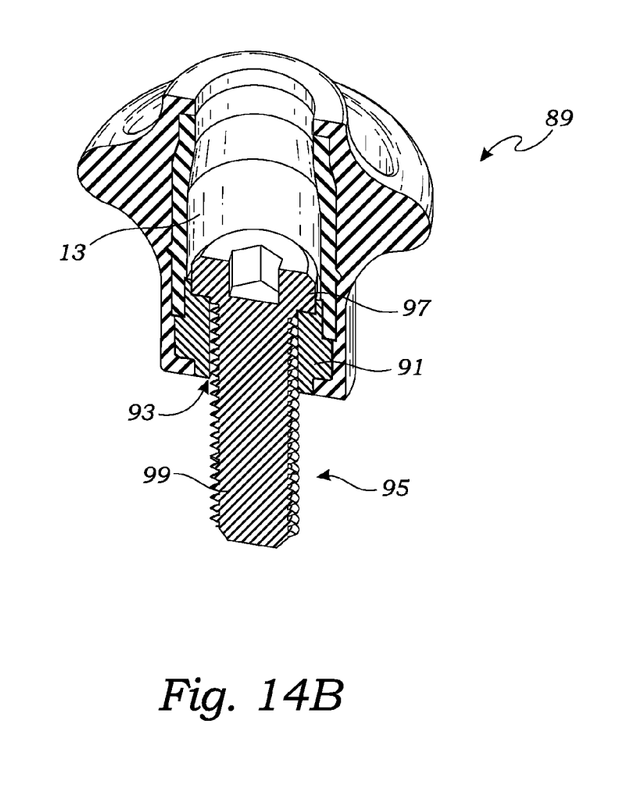
FIG. 14B is a top perspective cross-sectional view of the stackable fastener illustrated in FIG. 14A.

In still an additional third embodiment of the present invention, the stackable fastener includes a force member substantially similar to that described above and illustrated in FIGS. 5-7. However, as illustrated in FIGS. 12 and 13, instead of a force member 35 including a spiral slot 55 for receiving nubs 23 which project inwardly from the fingers, the slots and nubs are reversed so that the slots 55 are formed into the fingers 15 and the nubs 57 project outwardly from the force member's exterior. As illustrated in FIGS. 12 and 13, the force member nubs 57 project into the finger slots 55 such that rotation of the force member 35 causes the force member to move upwardly or downwardly in a spiral manner in accordance with the path of the slots 55. As with other embodiments, movement of the force member in the proximal direction causes the fingers to retract, but movement of the force member in the distal direction forces the fingers radially outward.

Figure 7A:
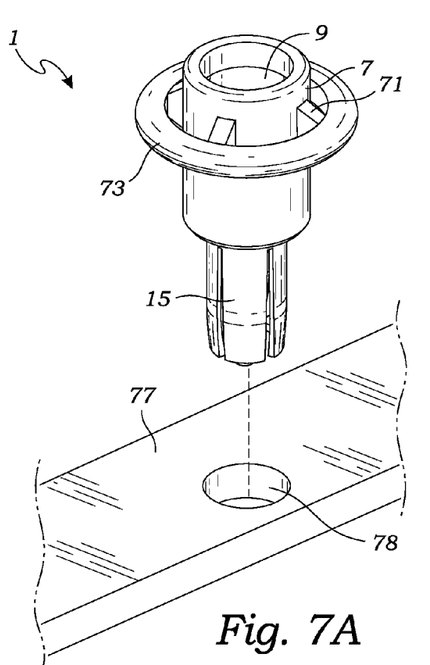
FIG. 7A is a top perspective view illustrating a stackable fastener of the present invention wherein its fingers are positioned radially inward prior to insertion into a substrate hole.
Figure 7B:
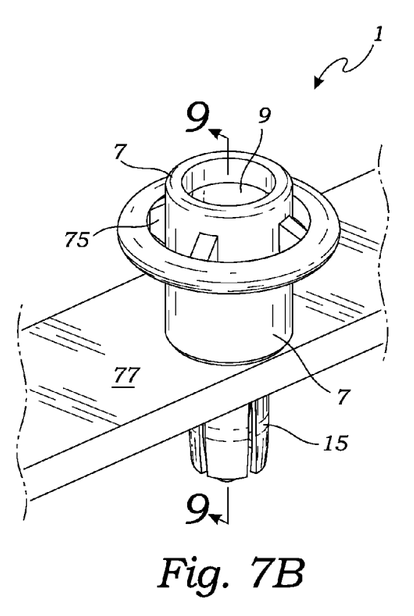
FIG. 7B is a top perspective view illustrating a stackable fastener of the present invention wherein its fingers are positioned radially inward, but have been projected through a substrate hole.
Figure 7C:
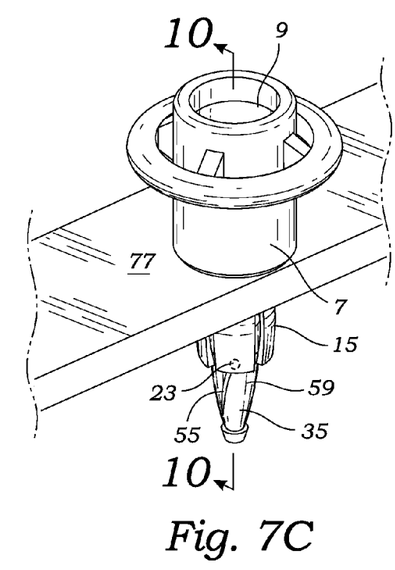
FIG. 7C is a top perspective view illustrating the stackable fastener of FIG. 7B wherein the force member has been rotated so as to force the stackable fastener fingers radially outward to lock the fastener to a substrate.
Figure 11:
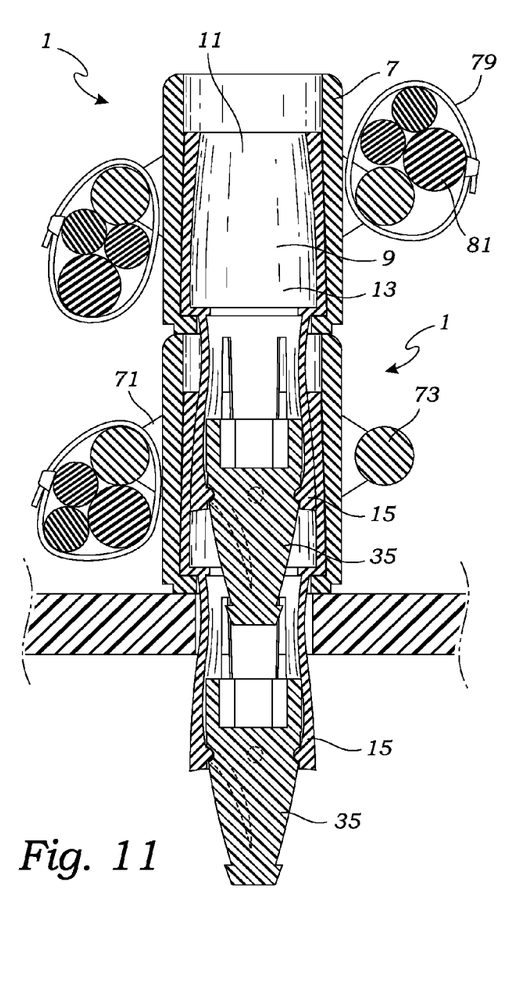
FIG. 11 is a side cross-sectional view of a pair of stackable fasteners affixed together and mounted to a substrate in accordance with FIG. 8.

As illustrated in FIGS. 7A-7C, the stackable fastener 1 is constructed to affix to a substrate 77 having a hole 78. The hole 78 must be properly sized so as to be sufficiently large to receive the fastener's fingers 15 when the fingers are retracted inward, as illustrated in FIGS. 7A and 7B. However, the hole 78 must be sized sufficiently small so as to prevent disengagement of the fastener 1 from the substrate 77 when the force member 35 has forced the fastener's fingers 15 radially outward. In addition, as illustrated in FIGS. 8-11, the stackable fastener's central bore 9 is sized to receive a similar fastener's fingers 15. Again, the central bore is sized to receive the fingers 15 when the fingers have been retracted radially inward. However, the central bore's size and tapered shape prevent removal of the fingers from the central bore, and a resulting disengagement of stackable fasteners, when the force member has been rotated so as to force the fingers 15 radially outward, as illustrated in FIG. 11. Advantageously, the stackable fastener can be affixed to a substrate 77, or any number of stackable fasteners can be stacked on top of one another.

Figure 8:
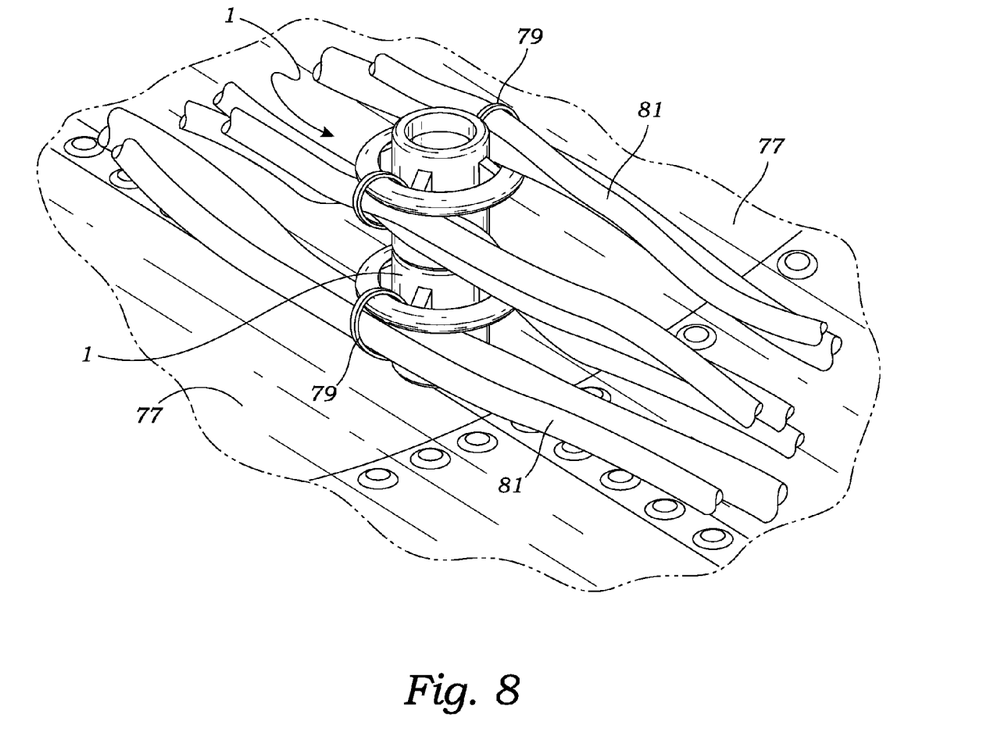
FIG. 8 is a top perspective view illustrating two (2) stackable fasteners of the present invention stacked together and mounted to a substrate.
Figure 9:
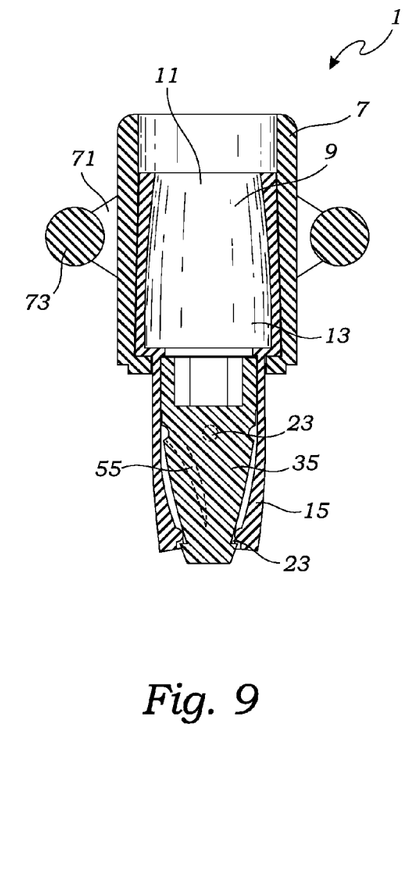
FIG. 9 is a side cross-sectional view of the stackable fastener illustrated in FIG. 7B.
Figure 10:
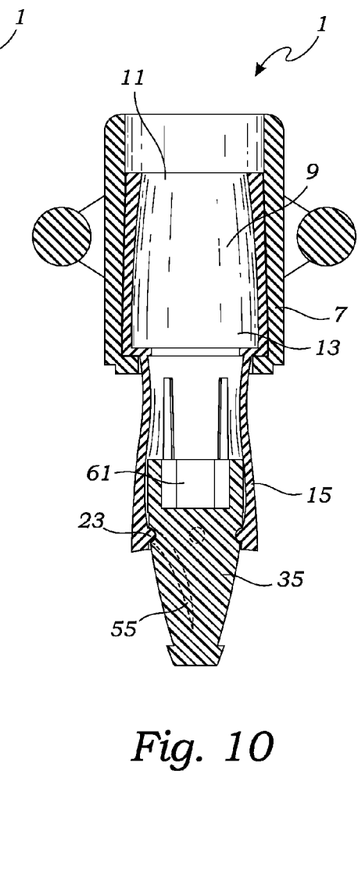
FIG. 10 is a side cross-sectional view of the stackable fastener illustrated in FIG. 7C.

As illustrated throughout FIGS. 1-13, the preferred stackable fastener 1 includes four spokes 71 which extend radially from the fastener's body 7. The fastener further includes a ring 77 concentric with the fastener's central axis when secured in place by the spokes 71. The spokes 71 are sufficiently thin so as to provide slots 75 which are sufficiently lodged to accept a conventional tie strap 79. As illustrated in FIG. 8, the stackable fastener of the present invention can affix to a substrate 77, be stacked upon one another, and affix elongate objects such as cables 81.

A disadvantage of the stackable fasteners illustrated in FIGS. 1-13 is that they are not ideal for mounting to a substrate having a female threaded hole. To overcome this disadvantage, still an additional stackable fastener 1 of the present invention is illustrated in FIGS. 14-18. This "hybrid" fastener 89 includes a male threaded distal end 99 for threadably affixing to a female threaded hole 87 formed in a substrate 77. However, like the stackable fasteners described above, the hybrid fastener 89 includes a proximal end having a tapered bore 9 for receiving the radially projectable fingers 15 of the stackable fasteners described above which do not have threaded elements.

Figures 15, 16:
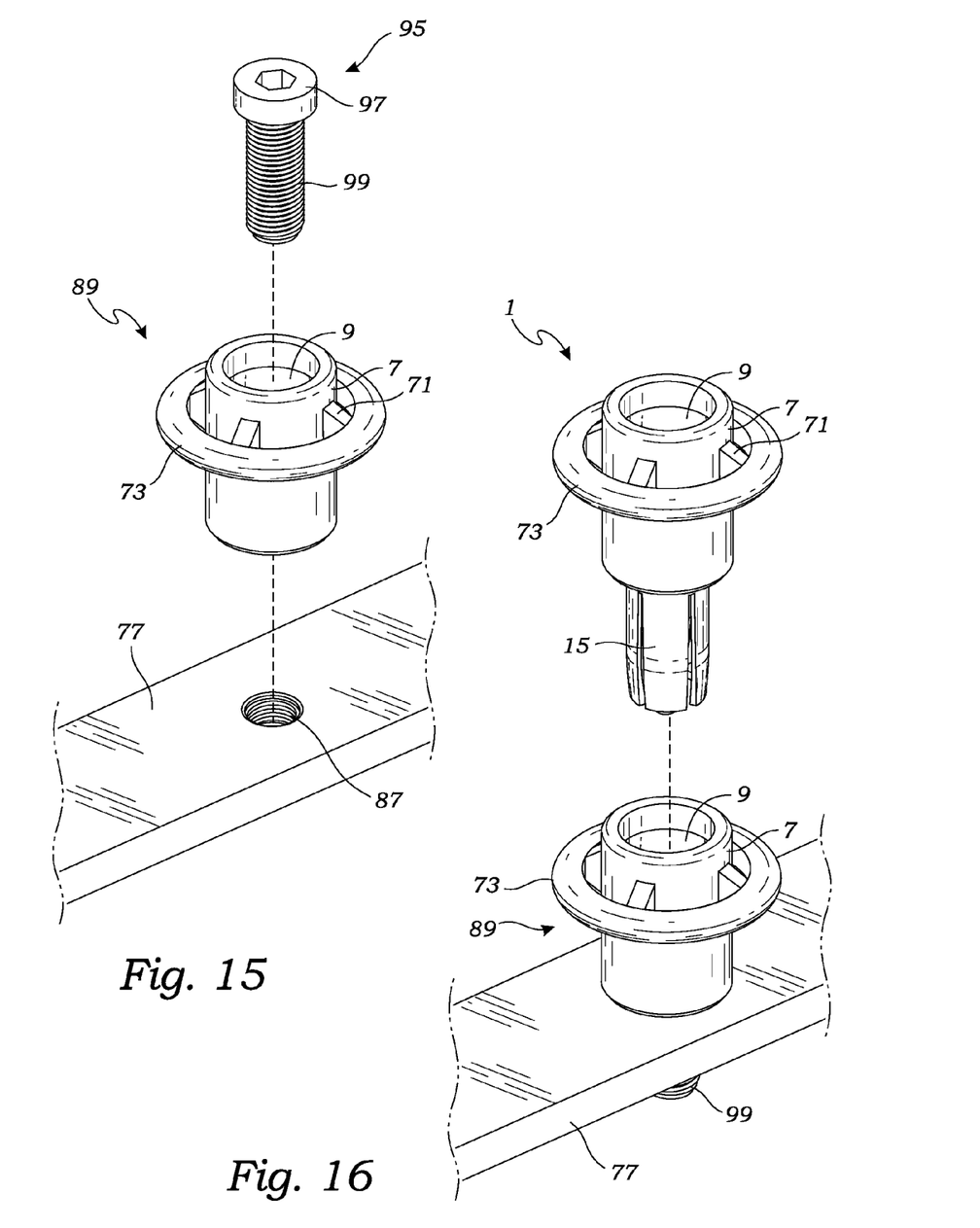
FIG. 15 is an exploded top perspective view of the stackable fastener illustrated in FIGS. 14A and 14B.
FIG. 16 is a top perspective view illustrating an embodiment of a stackable fastener without threaded elements to be mounted to a stackable fastener including a threaded element affixed to a substrate.
Figure 17:
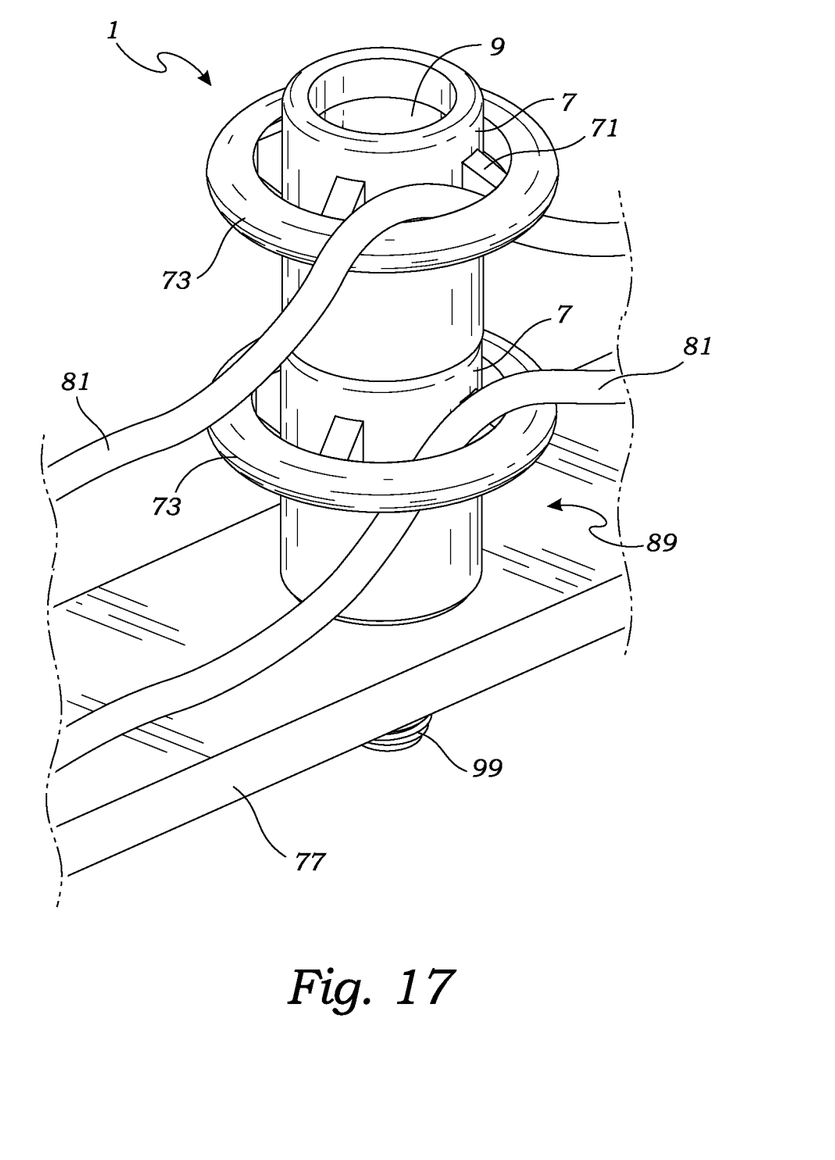
FIG. 17 is a top perspective view illustrating the stackable fasteners illustrated in FIG. 16 stacked together and mounted to a substrate having a threaded hole.

With reference to FIGS. 14-18, the hybrid fastener 89 includes a cylindrical body 7 having a substantially cylindrical central bore 9. As illustrated in FIG. 14B, the central bore has a proximal end 11 and a distal end 13. As with other embodiments, the central bore is tapered so as to have a diameter smaller at the bore's proximal end 11 than at the central bore's distal end 13. As illustrated in FIGS. 16 and 17, the hybrid fastener's central bore 9 is sized to receive and affix to the fingers 15 of the stackable fasteners 1 illustrated in FIGS. 1-13.

Figure 18:
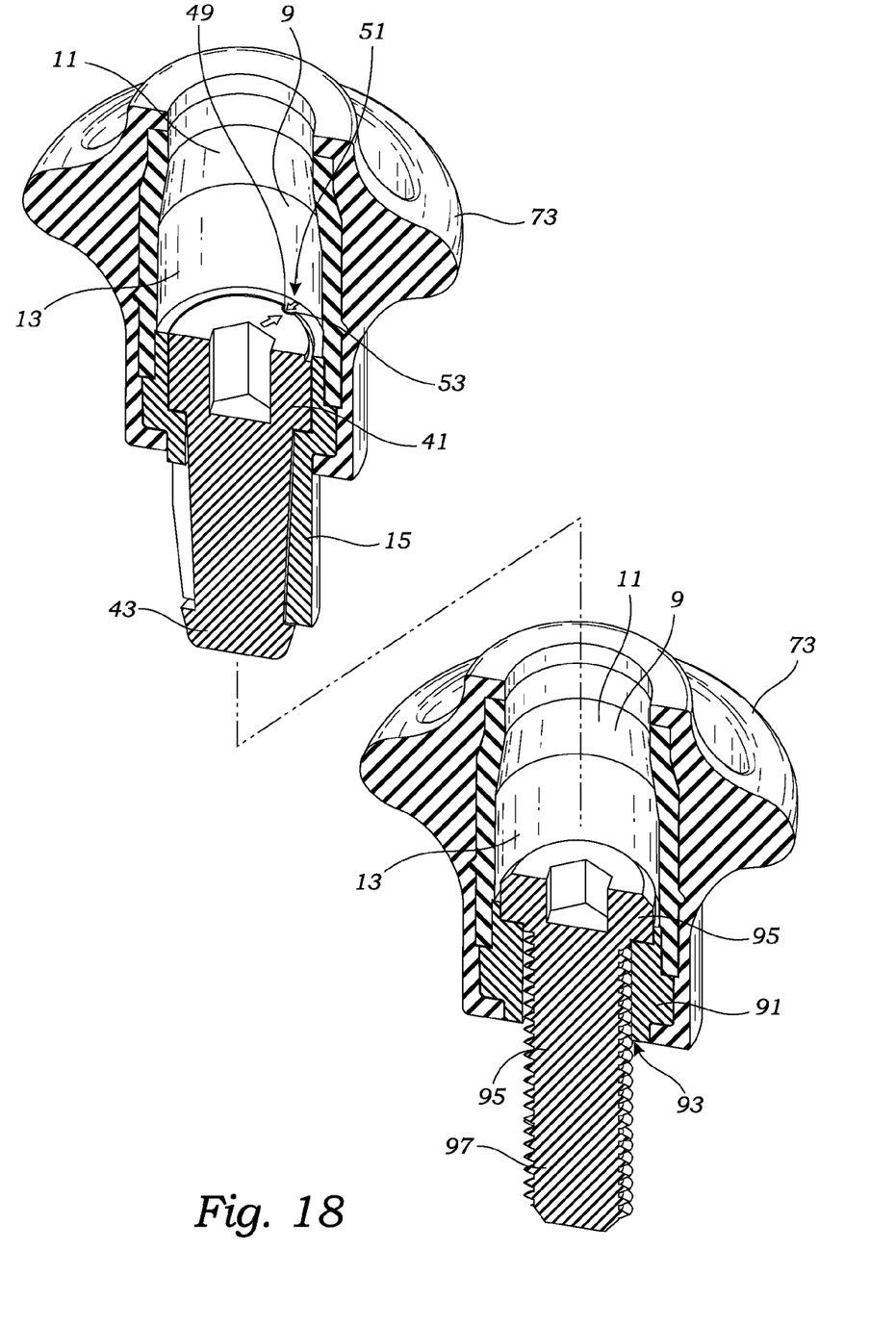
FIG. 18 is a top perspective cross-sectional view illustrating the two fasteners illustrated in FIGS. 16 and 17.

The hybrid stackable fastener 89 also includes a bolt 95 having a head 97 and a screw thread 99 which extends distally from the fastener's body 7. The bolt's head 97 may be affixed to the body's distal end so as to prevent their relative axial movement or rotation such as by molding the bolt head 97 into the body 7. However, in a more preferred embodiment, the bolt 95 floats within the fastener's central bore 9. For this embodiment illustrated in FIG. 14B and FIG. 15, the hybrid fastener 89 includes an annular shoulder 91 at the central bore's distal end 13. The annular shoulder forms a circular opening 93 having a diameter sufficiently large to allow the bolt's male screw thread 99 to project distally from the body's distal end. However, the bolt's head 97 has a diameter larger than the annular shoulder's opening 93 so as to allow the bolt to affix the fastener's body 7 to a substrate 77, as illustrated in FIG. 16. As illustrated in FIGS. 16-18, once the hybrid stackable fastener 89 has been affixed to a substrate 77, a stackable fastener 1 without a threaded element (as illustrated in FIGS. 1-13) can be affixed to the hybrid fastener 89. The hybrid fastener's central bore 7 is sized to receive the fingers 15 when the fingers have been retracted radially inward. Once the stackable fastener's fingers 15 have been projected into the hybrid stackable fastener's central bore 9, the fingers are forced radially outward, such as by rotation of a force member, so as to lock a stackable fastener 1 as illustrated in FIGS. 1-13 upon a hybrid stackable fastener 89 as illustrated in FIGS. 14-18. Advantageously, once a hybrid stackable fastener 89 has been affixed to the threaded hole 87 of a substrate 77, any number of stackable fasteners 1 can be stacked on top of one another.

The stackable fasteners 1 and 89 are preferably made of plastic. Acceptable plastics include thermal plastics such as ABS, polyvinyl chloride, polyethylene, styrene, and nylon. Thermosetting plastics such as polyester and silicon are also acceptable. In a preferred embodiment, the stackable fastener is made of a woven polyamide. Alternative materials including composites or metals including steel, aluminum, titanium and alloys may also be selected by those skilled in the art. Furthermore, a combination of these materials may be employed to obtain the mechanical properties desired.

While several particular forms of the invention have been illustrated and described, it will be apparent that various modifications can be made without departing from the spirit and scope of the invention. Therefore, it is not intended that the invention be limited except by the following claims.

Having described my invention in such terms so as to enable persons skilled in the art to understand the invention, recreate the invention and practice it, and having presently identified the presently preferred embodiments thereof, I claim:

1. A hybrid stackable fastener comprising:
   an annularly shaped body forming a central bore defining a central axis, said bore having a distal end and a proximal end, said bore forming an opening at its proximal end with said central bore being tapered to have a diameter smaller at the bore's proximal end than toward the bore's distal end;
   a plurality of spokes radially projecting from said body;
   a ring concentric with said body;
   said spokes engaging and radiating radially inward from said ring to engage said body to form a plurality of hollow slots with the periphery of each of said slots being defined by said body, a pair of adjacent spokes and said ring so that said slots form bores permitting the passage of objects; and
   a bolt having a screw thread which extends distally in the direction of said central axis from the body's central bore.

2. The hybrid stackable fastener of claim 1 wherein said bolt is rotatable within said central bore.

* * * * *